US007013749B2

(12) United States Patent
Uno

(10) Patent No.: US 7,013,749 B2
(45) Date of Patent: Mar. 21, 2006

(54) ROBOT DRIVEN ROBOT INDEX SYSTEM

(75) Inventor: Katsutoshi Uno, Rochester Hills, MI (US)

(73) Assignee: TESCO Engineering, Inc., Auburn Hills, MI (US)

( * ) Notice: Subject to any disclaimer, the term of this patent is extended or adjusted under 35 U.S.C. 154(b) by 56 days.

(21) Appl. No.: 10/862,615

(22) Filed: Jun. 7, 2004

(65) Prior Publication Data

US 2005/0268810 A1 Dec. 8, 2005

(51) Int. Cl.
*B25J 17/00* (2006.01)

(52) U.S. Cl. ............... 74/490.01; 74/490.03; 104/53; 901/6

(58) Field of Classification Search ............ 104/53, 104/54, 88.04, 88.01; 74/490.01, 490.03, 74/490.08, 490.07; 901/6
See application file for complete search history.

(56) References Cited

U.S. PATENT DOCUMENTS

| 4,942,538 | A | * | 7/1990 | Yuan et al. ............ 700/259 |
| 5,373,764 | A | * | 12/1994 | Borzym ................. 83/385 |
| 5,551,120 | A | | 9/1996 | Cipolla et al. |
| 6,279,196 | B1 | | 8/2001 | Kasen et al. |
| 6,446,302 | B1 | | 9/2002 | Kasper et al. |
| 6,752,584 | B1 | * | 6/2004 | Woodruff et al. ....... 414/744.5 |
| 2003/0172834 | A1 | * | 9/2003 | De-Gol ................. 104/53 |

* cited by examiner

*Primary Examiner*—Frantz F. Jules
(74) *Attorney, Agent, or Firm*—Fildes & Outland, P.C.

(57) ABSTRACT

A robot driven robot index system includes a track having indices defining robot workstation positions along the track. The system also includes a non-driven carriage movable about the track. The carriage has a locking device for controllably locking the carriage to the track. The system further includes a robot having a base and a swingable, movable arm. The robot base is secured to the non-driven carriage. The system also includes at least one reference connector spacedly disposed from the track and located within a working range of the robot. The robot arm is adapted to connect with the reference connector, for moving the robot along the track between workstations through the movement of the robot arm.

9 Claims, 5 Drawing Sheets

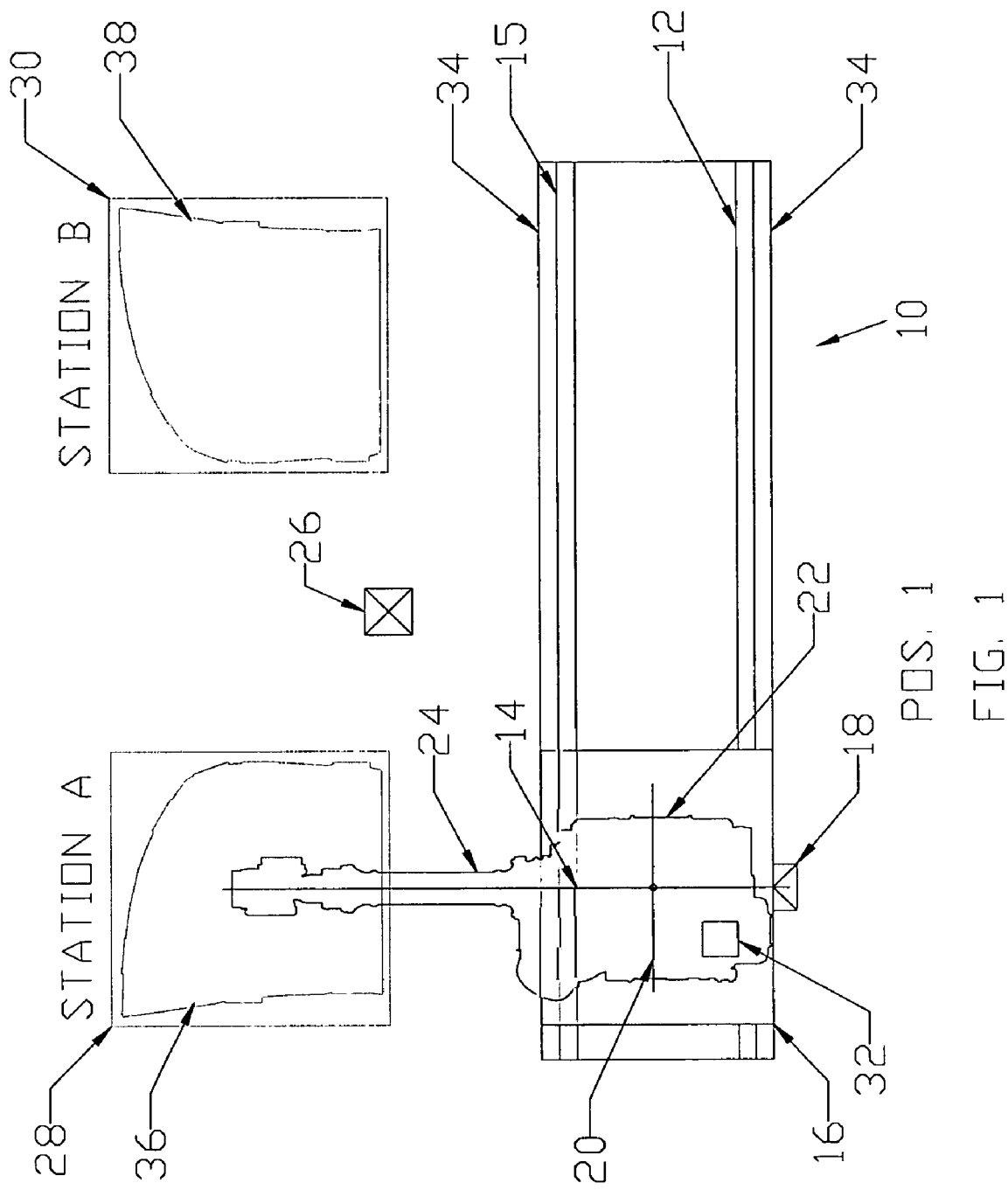

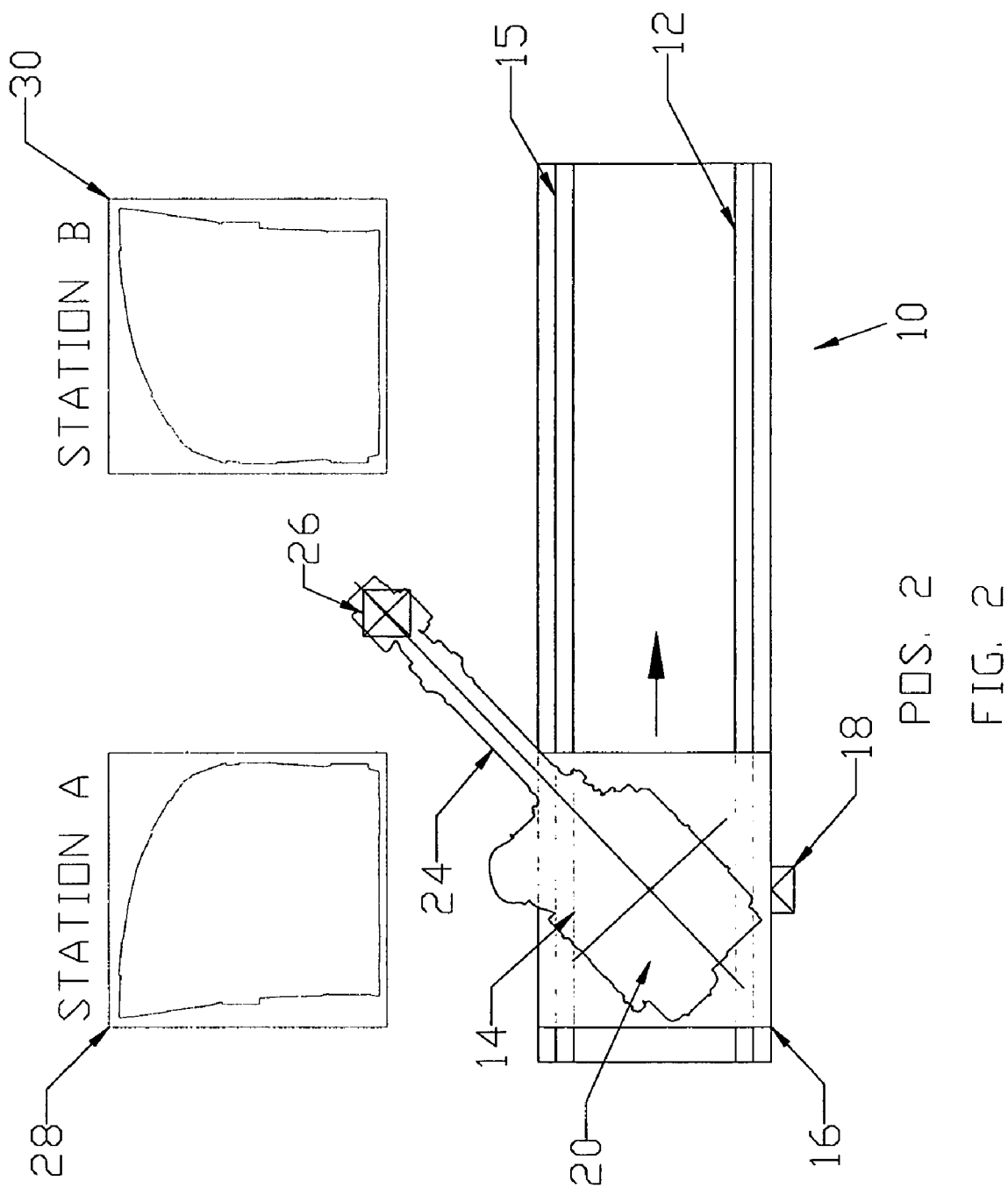

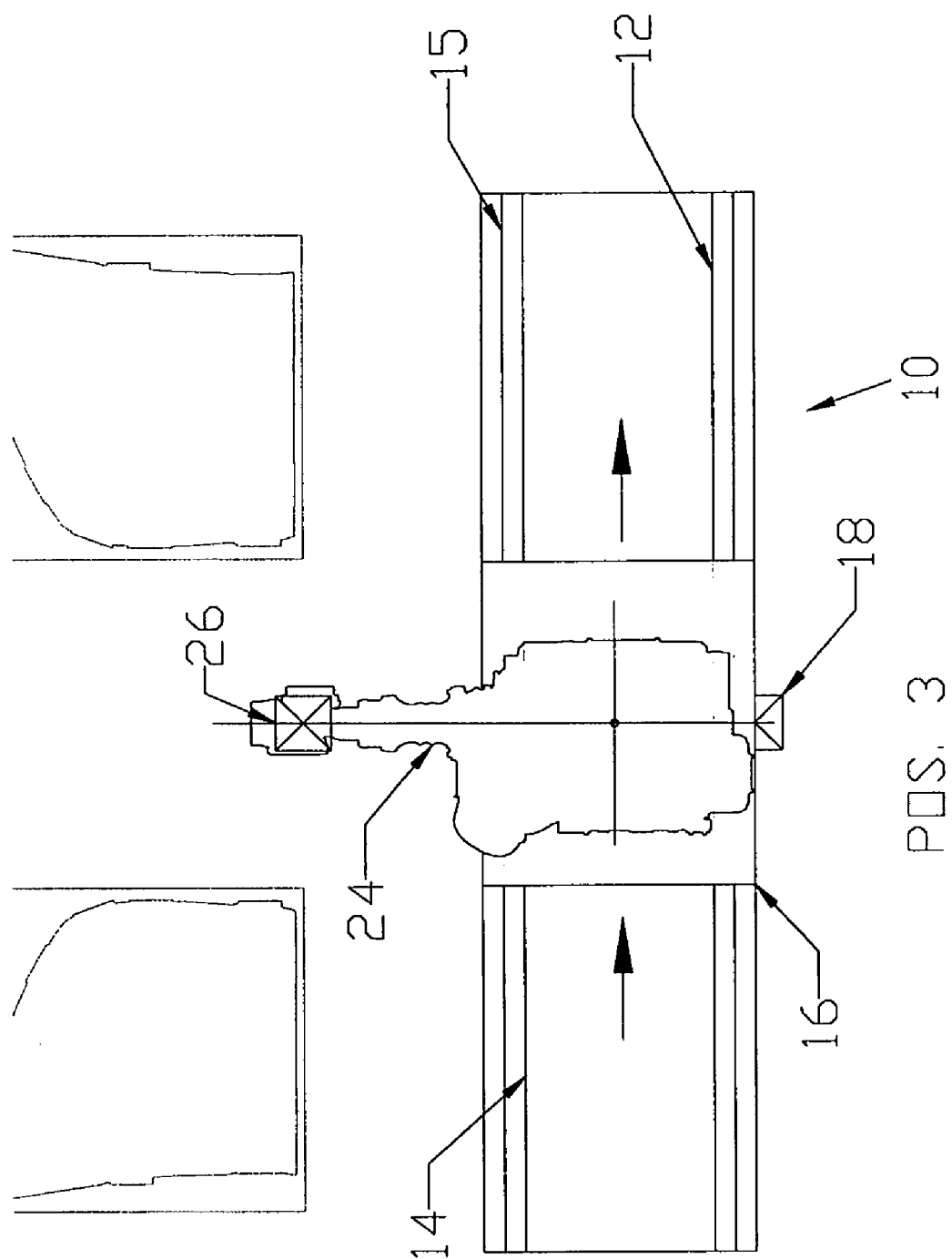

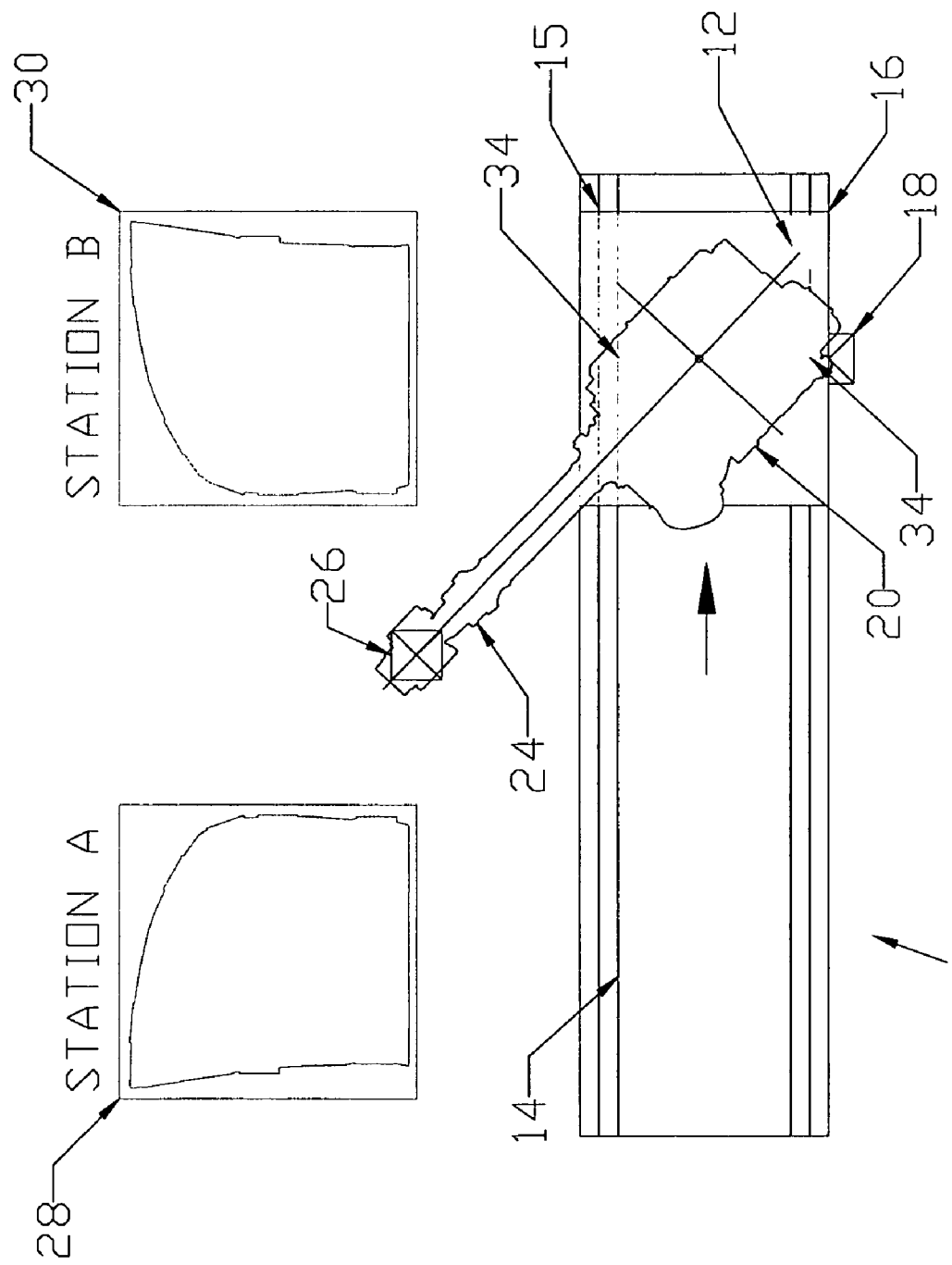

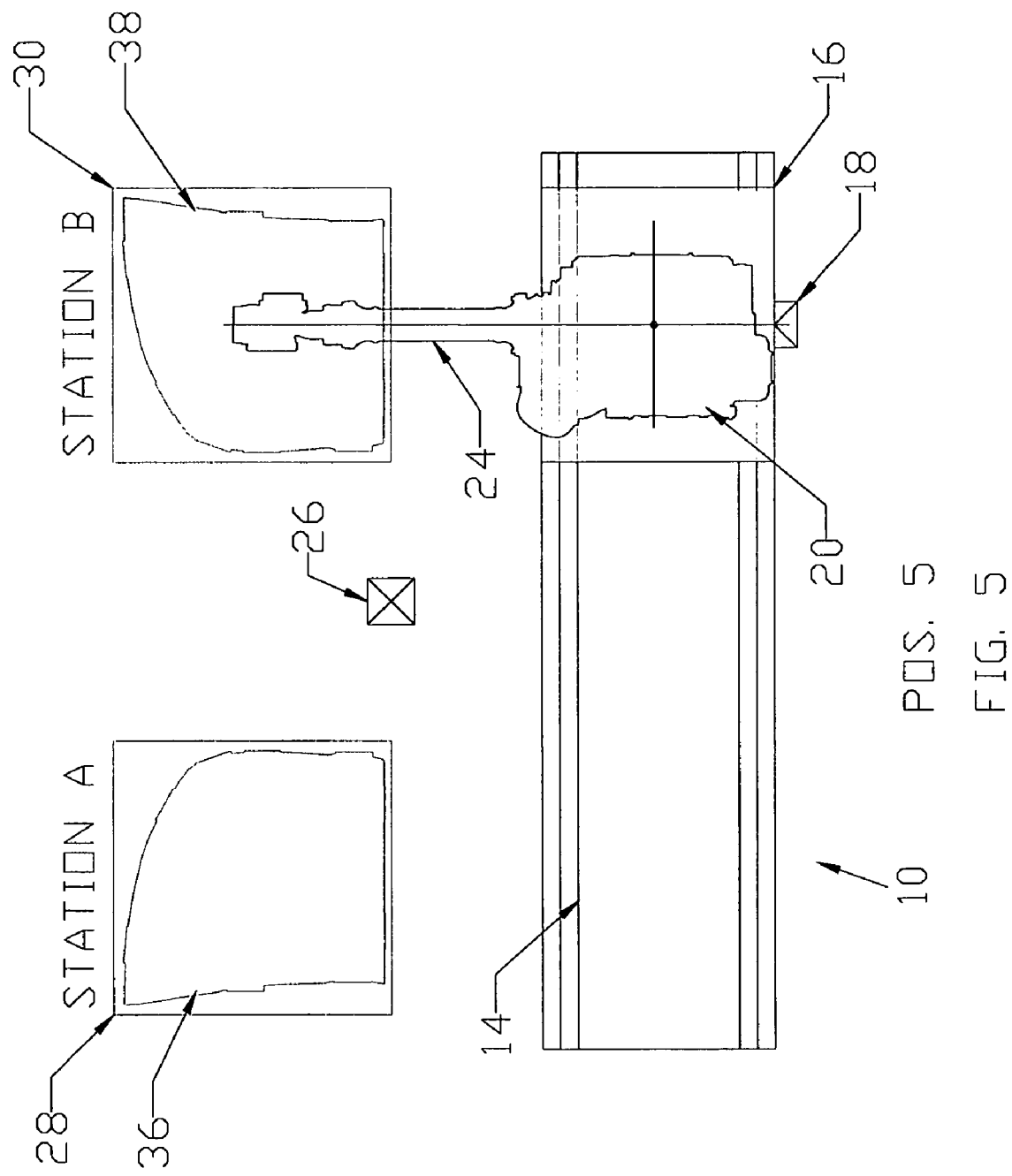

ROBOT DRIVEN ROBOT INDEX SYSTEM

TECHNICAL FIELD

This invention relates to robotic automation, and more particularly to robotic automation for robotic performance of operations at various workstations.

BACKGROUND OF THE INVENTION

Conventional robot indexing systems utilize a motorized indexing drive system to index a robot in a linear direction on a track system to move the robot between operating positions and to extend the reach and range of the robot path. This motion is typically referred to as the seventh axis of the robot. Conventional robot indexing systems, because of this design, require a seventh axis drive control package, which increases the cost of the system.

SUMMARY OF THE INVENTION

The present invention provides a robot driven robot index system that allows for seventh axis indexing on the robot without the significant added cost of a seventh axis drive control package.

A robot driven robot index system in accordance with the present invention includes a track having indices defining robot workstation positions along the track. The robot driven robot index system also includes a non-driven carriage movable about the track. The carriage includes a locking device for controllably locking the carriage to the track. The robot driven robot index system also includes a robot having a base and a swingable, movable arm. The robot base is secured to the non-driven carriage. The robot driven robot index system further includes at least one reference connector spacedly disposed from the track and located within a working range of the robot. The robot arm is adapted to connect with the reference connector, for moving the robot along the track between workstations through the movement of the robot arm. Multiple reference connectors may be used consecutively in series to extend the allowable travel distance of the robot and carriage between workstations.

In a specific embodiment, the robot of the robot driven robot index system may be a 6-axis robot. The robot may include a control for engaging and disengaging the locking device. The track may be generally linear. Each index along the track may be aligned with a workstation spacedly disposed from the track. The track may include stops thereabout. Each of the reference connectors may be generally centered along the length of the track between two workstations.

A method of driving a robot along a path includes the step of providing a robot driven robot index system as described above. The method may further include the steps of: linking the arm of the robot to one of the reference connectors; disengaging the locking device of the carriage to allow the carriage to move freely about the track; swinging the arm of the robot about the reference connector, thereby moving the carriage along the track; stopping the carriage at the next index of the track; engaging the locking device to temporarily fix the carriage to the track; and releasing the arm of the robot from the reference connector.

These and other features and advantages of the invention will be more fully understood from the following detailed description of the invention taken together with the accompanying drawings.

BRIEF DESCRIPTION OF THE DRAWINGS

In the drawings:

FIG. 1 is a schematic plan view of a robot driven robot index system in accordance with the present invention illustrating a carriage locked to a track and a robot on the carriage performing a working operation at a first workstation;

FIG. 2 is a schematic plan view of the system of FIG. 1 illustrating the carriage unlocked from the track and the robot linked to a reference connector spaced from the workstation and track;

FIG. 3 is a schematic plan view of the system of FIG. 1 illustrating the robot moving itself along the track via the link to the reference connector;

FIG. 4 is a schematic plan view of the system of FIG. 1 illustrating the robot having moved to an index along the track aligned with a second workstation; and FIG. 5 is a schematic plan view of the system of FIG. 1 illustrating the carriage locked to the track and the robot on the carriage performing a working operation at the second workstation.

DETAILED DESCRIPTION OF THE INVENTION

Referring now to the drawings in detail, numeral 10 generally indicates a robot driven robot index system in accordance with the present invention. The robot driven robot index system 10 advantageously allows for an indexing seventh axis on a robot without the significant added cost of a seventh axis drive control package.

With reference to FIG. 1, the robot driven robot index system 10 includes a track 12 having indices 14, 15 defining robot workstation positions along the track. The robot driven robot index system 10 also includes a non-driven carriage 16 movable about the track 12. The non-driven carriage 16 includes a locking device 18 for controllably locking the carriage 16 to the track 12. The robot driven robot index system 10 also includes a robot 20 having a base 22 and a swingable, movable arm 24. The robot base 22 is secured to the non-driven carriage 16. The robot driven robot index system 10 further includes at least one reference connector 26 spacedly disposed from the track 12 and located within a working range of the robot 20. The robot arm 24 is adapted to connect with the reference connector 26, for moving the robot 20 along the track 12 between workstations 28, 30 through the movement of the robot arm 24.

In one embodiment, the robot 20 of the robot driven robot index system 10 may be a 6-axis robot. The robot 20 may also include a control 32 for engaging and disengaging the locking device 18. The track 12 may be generally linear. Each index 14, 15 along the track 12 may be aligned with a workstation 28, 30 spacedly disposed from the track 12. The track 12 may include stops 34 thereabout. Each of the reference connectors 26 may be generally centered along the length of the track 12 between two workstations 28, 30.

FIGS. 1 through 5 illustrate seventh axis indexing operations of the robot driven robot index system 10 that allow the robot 20 to move from one workstation 28 to another. In FIG. 1, the locking device 18 of the carriage 16 is engaged, thereby locking the carriage 16 to the track 12 to prevent inadvertent movement of the carriage 16 or the attached robot 20. The carriage 16 is located at an index 14 of the track 12 that defines a robot workstation position, in this case a position for a workstation 28 that is denoted as "Station A." The arm 24 of the robot 20 is positioned over the workstation 28 for performing an operation on a workpiece 36.

Turning to FIG. 2, the robot arm 24 of the robot 20 is controllably swung from the workstation 28 to the reference connector 26 in preparation for moving the robot. The reference connector 26 is within a working range of the robot 20 such that the robot arm 24 can reach the reference connector when the robot is positioned at an index 14 of the track 12 corresponding to the position of the workstation 28. The robot arm 24 is linked to the reference connector 26. The locking device 18 of the carriage 16 is disengaged, thereby allowing the carriage to move freely about the track 12.

Turning to FIG. 3, while the robot arm 24 is linked to the reference connector 26 and the locking device 18 of the carriage 16 is disengaged, the robot arm 24 is controllably swung about the reference connector 26. This swinging motion of the robot arm 24 causes the carriage 16 to move along the track 12 in a direction of the reference connector 26 and the next workstation 30, in this case denoted as "Station B." An index 15 of the track 12 defines a robot workstation position for Station B.

Turning to FIG. 4, the carriage 16 is stopped at the index 15 of the track 12 defining the robot workstation position for Station B. Stops 34, as also seen in FIG. 1, aid in stopping and positioning the carriage at the index 15 for the workstation 30, in this case Station B.

Turning to FIG. 5, once the carriage 16 is in position at the workstation 30, the locking device 18 of the carriage 16 is engaged, thereby temporarily fixing the carriage 16 to the track 12 until the carriage 16 is to be moved again. The robot arm 24 of the robot 20 is released from the reference connector 26. The robot arm 24 is then swung from the reference connector 26 to the workstation 30 for performing an operation on a workpiece 38.

The robot driven robot index system 10 may be expanded beyond the embodiment described. Specifically, the track 12 may be any length to allow for more than two workstations located at multiple robot workstation positions along the track. For example, it may be desired to have one robot 20 perform operations at four workstations. In this case, the robot driven robot index system 10 would include four indices defining robot workstation positions along the track 12 and at least three reference connectors 26. Each reference connector 26 may be located between a unique pair of two of the workstations. It is also possible that multiple reference connectors 26 may be used consecutively in series between a unique pair of two workstations to extend the allowable travel distance of the robot 20 and the carriage 16 between workstations. In any case, the robot 20, via the carriage 16 and the reference connectors 26, would then be able to move itself from one workstation to the next. It can be seen that the robot driven robot index system 10 easily allows for expansion of the range of the carriage 16, and hence the robot 20, to span between multiple workstations without the cost of extending a seventh axis drive control package.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A robot driven robot index system comprising:
   a track including indices defining robot workstation positions along said track;
   a non-driven carriage movable about said track; said carriage including a locking device for controllably locking said carriage to said track;
   a robot having a base and a swingable, movable arm;
   said robot base being secured to said non-driven carriage; and
   at least one reference connector spacedly disposed from said track and located within a working range of said robot;
   wherein said robot arm is connectable with said reference connector, for moving said robot along said track between workstations through the movement of said robot arm.

2. The robot driven robot index system of claim 1, wherein said robot is a 6-axis robot.

3. The robot driven robot index system of claim 1, wherein said robot includes a control for engaging and disengaging said locking device.

4. The robot driven robot index system of claim 1, wherein said track is generally linear.

5. The robot driven robot index system of claim 1, wherein each said index is aligned with a workstation spacedly disposed from said track.

6. The robot driven robot index system of claim 1, wherein said track includes stops thereabout.

7. The robot driven robot index system of claim 1, wherein each of said reference connectors is generally centered along the length of said track between two workstations.

8. A method of driving a robot along a path comprising the step of:
   providing:
   a track including indices defining robot workstation positions along said track;
   a non-driven carriage movable about said track; said carriage including a locking device for controllably locking said carriage to said track;
   a robot having a base and a swingable, movable arm;
   said robot base being secured to said non-driven carriage; and
   at least one reference connector spacedly disposed from said track and located within a working range of said robot;
   wherein said robot arm is connectable with said reference connector, for moving said robot along said track between workstations through the movement of said robot arm.

9. The method of claim 8, further comprising the steps of:
   linking the arm of said robot to one of the reference connectors;
   disengaging the locking device of said carriage to allow said carriage to move freely about said track;
   swinging the arm of said robot about said reference connector, thereby moving said carriage along said track;
   stopping the carriage at the next index of said track;
   engaging the locking device to temporarily fix said carriage to said track; and
   releasing the arm of said robot from said reference connector.

* * * * *